(12) United States Patent
Lin et al.

(10) Patent No.: US 6,593,721 B1
(45) Date of Patent: Jul. 15, 2003

(54) CONNECTION DEVICE FOR CHARGING ELECTRIC VEHICLES

(75) Inventors: Yung-Shuen Lin, Chia-I Hsien (TW); Kun-Chung Lin, Chia-I (TW); Yih-Yuan Lan, Chia-I Hsien (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 10/022,513

(22) Filed: Dec. 20, 2001

(51) Int. Cl.[7] ................................................. H02J 7/00
(52) U.S. Cl. ....................................................... 320/104
(58) Field of Search ......................................... 320/104

(56) References Cited

U.S. PATENT DOCUMENTS

| | | | | |
|---|---|---|---|---|
| 5,757,595 A | * | 5/1998 | Ozawa et al. ................ | 340/636 |
| RE36,225 E | * | 6/1999 | Harris ........................ | 320/104 |
| 5,955,868 A | * | 9/1999 | Kaite et al. .................. | 320/119 |
| 6,157,162 A | * | 12/2000 | Hayashi et al. ............. | 320/104 |

* cited by examiner

*Primary Examiner*—Edward H. Tso
*Assistant Examiner*—Pia Tibbits
(74) *Attorney, Agent, or Firm*—Birch, Stewart, Kolasch & Birch, LLP

(57) ABSTRACT

A connection device for charging electric vehicles provides direct electrical connection for an external source of electricity to charge the battery of an electric vehicle. It mainly comprises a movable charging terminal combined with a switch, both located on the body of an electric vehicle. When the charging terminal is moved into a position that enables an electrical connection with an external source of electricity, the switch is automatically moved into a position that cuts off electricity to the driving motor of the electric vehicle, rendering the electric vehicle incapable of being started during electric charging, thus preventing accidents from occurring.

8 Claims, 5 Drawing Sheets

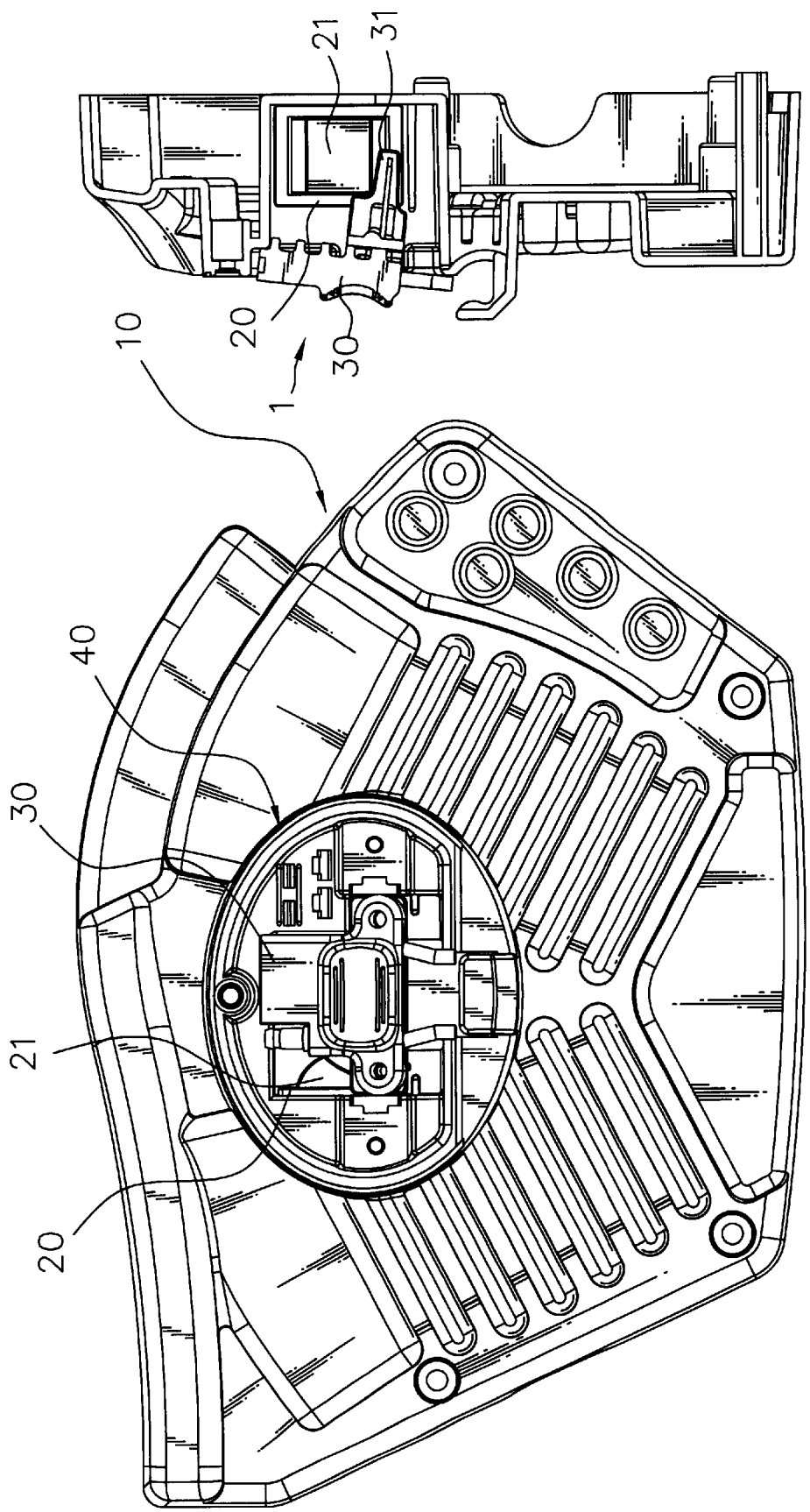

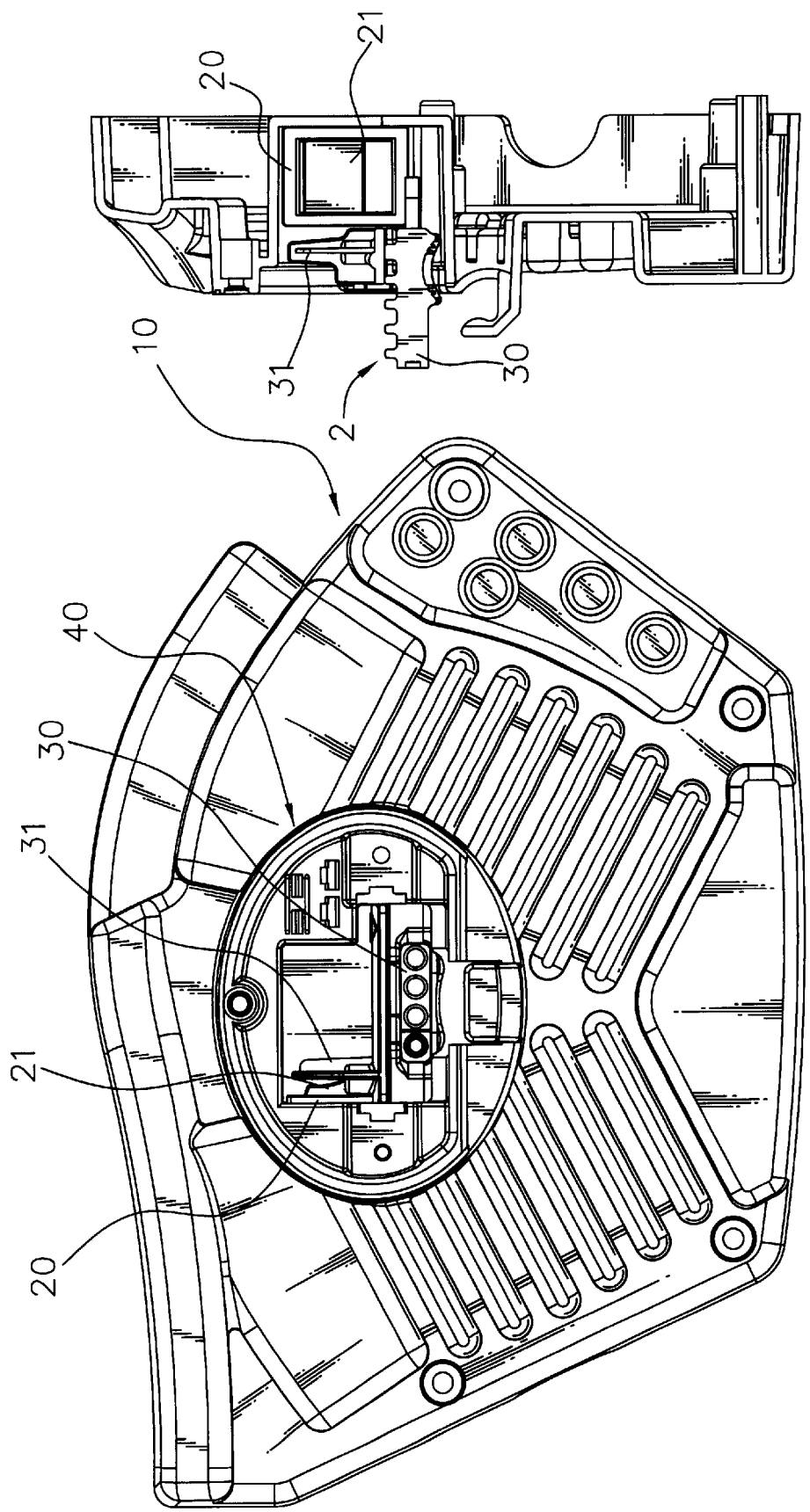

CONNECTION DEVICE FOR CHARGING ELECTRIC VEHICLES

FIELD OF THE INVENTION

The invention relates to a connection device for charging electric vehicles, designed to connect an electric vehicle to an external source of electricity that charges the electric vehicle, whenever necessary.

BACKGROUND OF THE INVENTION

There are many different types of electric vehicles, but they can basically be divided into two categories, namely those operated by remote control and those designed for a passenger. Take an electric vehicle that seats a child passenger for example. It imitates real vehicles, and it may look like a jeep, a beach car, a car, a motorbike, a racing car or a golf cart, etc.—any of a diverse range of products. It appears in so many forms that the child passengers have different options. In addition to its various appearances, this type of child electric vehicle gives priority to safety, as it is designed for child passengers.

On the whole, a child electric vehicle may look like any of the aforesaid vehicles. It has a plurality of wheels depending on its structure. It contains a motor that makes the wheels turn. With a pedal that is electrically connected to the motor, a child can control the child electric vehicle and make it go. Of course, the motor cannot work without electricity. In general, the electric vehicle has a battery that can be connected to the external source of electricity for charging when it runs out of electricity, and the battery supplies power to the motor. To be safe, during the charging process, users should be prevented from accidentally stepping on the pedal—which may cause an accident. The existing safety measures involve the removal of the connecting wire between the motor and the battery to make sure that the motor receives no electric supply from the battery, and then connecting the external source of electricity to the battery for charging. After charging, the connecting wire between the motor and the battery is removed, then connect the battery and the motor with the, connecting wire again.

From a user's point of view, this procedure ensures that an electric vehicle is used safely, though it may be somewhat troublesome. In addition the repeated connection and disconnection of the connecting wires may lead to poor electrical contact, affecting the normal operation of the electric vehicle or even giving the user an electric shock.

OBJECT AND SUMMARY OF THE INVENTION

The primary object of the invention is to free users from cutting off the electric supply provided by a battery for a motor during the process of charging an electric vehicle, but prevent the start-up of the electric vehicle to ensure users' safety.

To achieve the aforesaid object, the invention discloses a connection device for charging electric vehicles. The connection device primarily comprises a movable charging terminal and a switch, both found on the body of the electric vehicle. When the charging terminal is moved to a position that enables the connection of the external source of electricity for charging, a switch is turned off and the electric supply to the driving motor of the electric vehicle is cut off. As a result, any attempt to start up the electric vehicle will fail while the electric vehicle is being charged.

To make the aforesaid, or any other object, characteristic and merit of the invention clear and easy to understand, a preferred embodiment, with drawings attached, is given below to illustrate the invention in detail.

BRIEF DESCRIPTION OF THE DRAWINGS

FIGS. 3A & 3B are the end views of the invention;

FIGS. 5A & 5B are diagrams of the motion of an embodiment of the invention when it is in use, showing the charging terminal that is moved to position 2;

DETAILED DESCRIPTION OF THE PREFERRED EMBODIMENT

Figure 1:
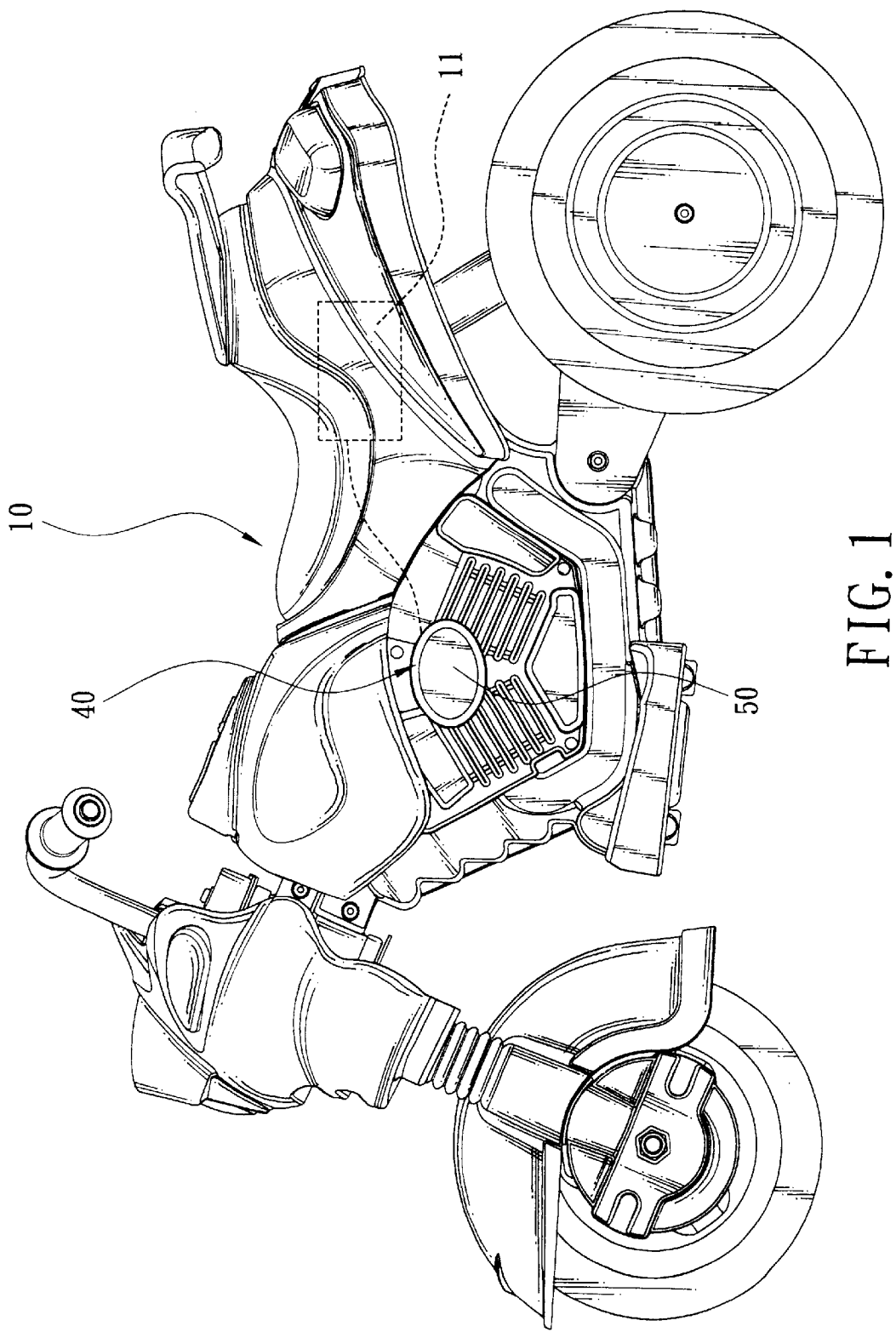
FIG. 1 is a diagram showing an embodiment of the invention for an electric vehicle.
Figure 2:
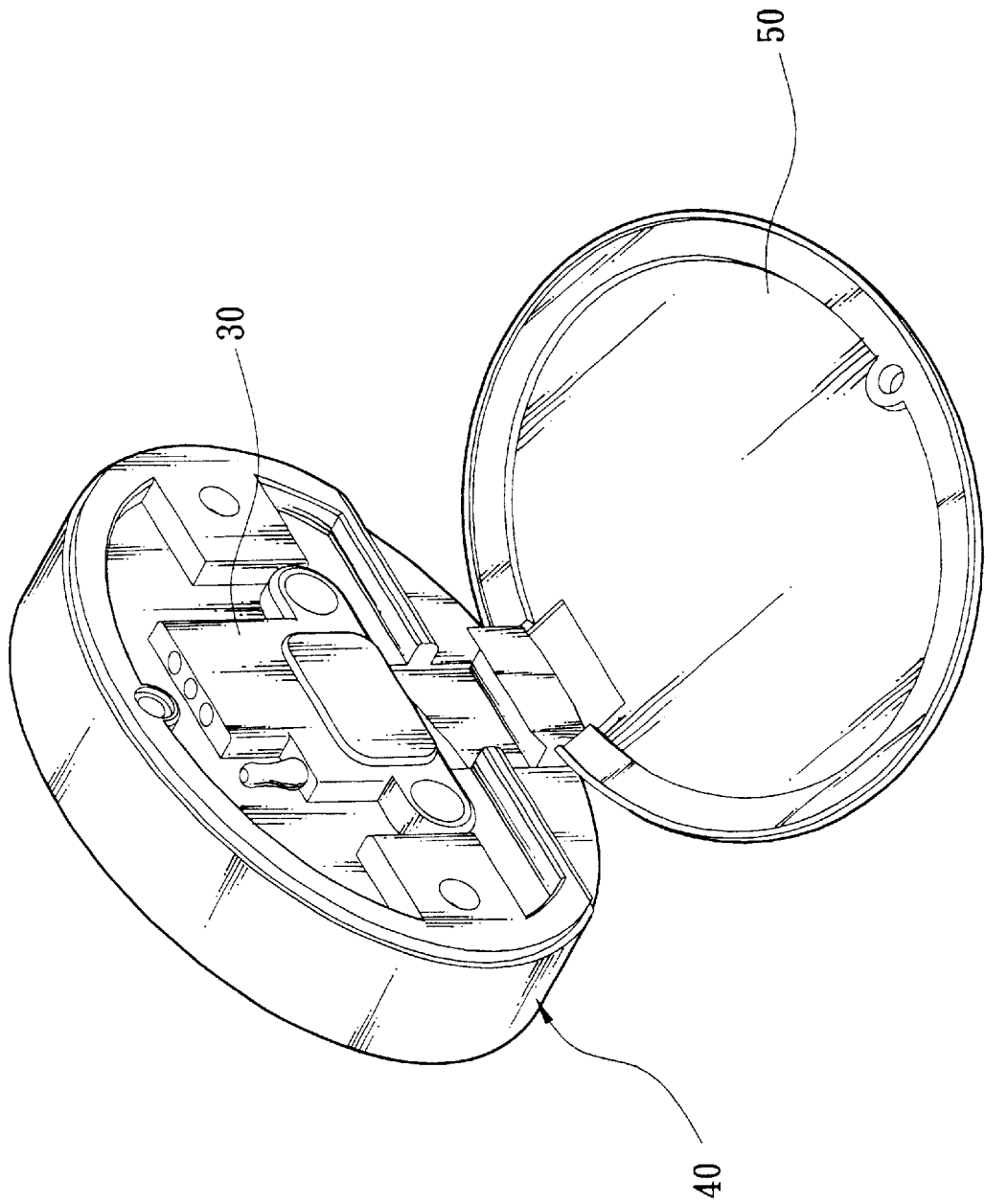
FIG. 2 is a 3-D diagram of the invention.

Please refer to FIG. 1. The connection device for charging electric vehicle disclosed by the invention is installed in a suitable position in an electric vehicle 10 according to the vehicle's model and design. As shown in FIGS. 2, 3A and 3B, the connection device comprises a switch 20 and a charging terminal 30. Equipped with a control button 21, the switch 20 is a dual-positioned switch and it is electrically connected via a conducting wire, to a battery 11 and a motor (not shown in the diagrams) in the electric vehicle 10. In addition, a user can make the battery 11 send an electricity to the motor by switching on the control button 21 of the switch 20. The charging terminal 30 installed on the side of the switch 20 is moveable, and it is also electrically connected to the battery 11 via conducting wire.

With the aforesaid components, in the event that an electric vehicle 10 has to be recharged, its charging terminal 30 is electrically connected to a connector. This connector is connected to an external power supply, and the battery 11 is charged while receiving electricity via the charging terminal 30. In practice, the switch 20 and the charging terminal 30 may integrate and become a modular structure. Moreover, for esthetic purposes, the cover plate 50 may also be installed on the electric vehicle 10 or on a seat 40. Usually, the cover plate 50 is moved to a "covered" position, so that it covers the switch 20 and the charging terminal 30. However, while the battery 11 is being charged, the cover plate 50 may be moved to a "charging" position, so that the charging terminal 30 can be connected to the external power supply.

Figures 4A, 4B:
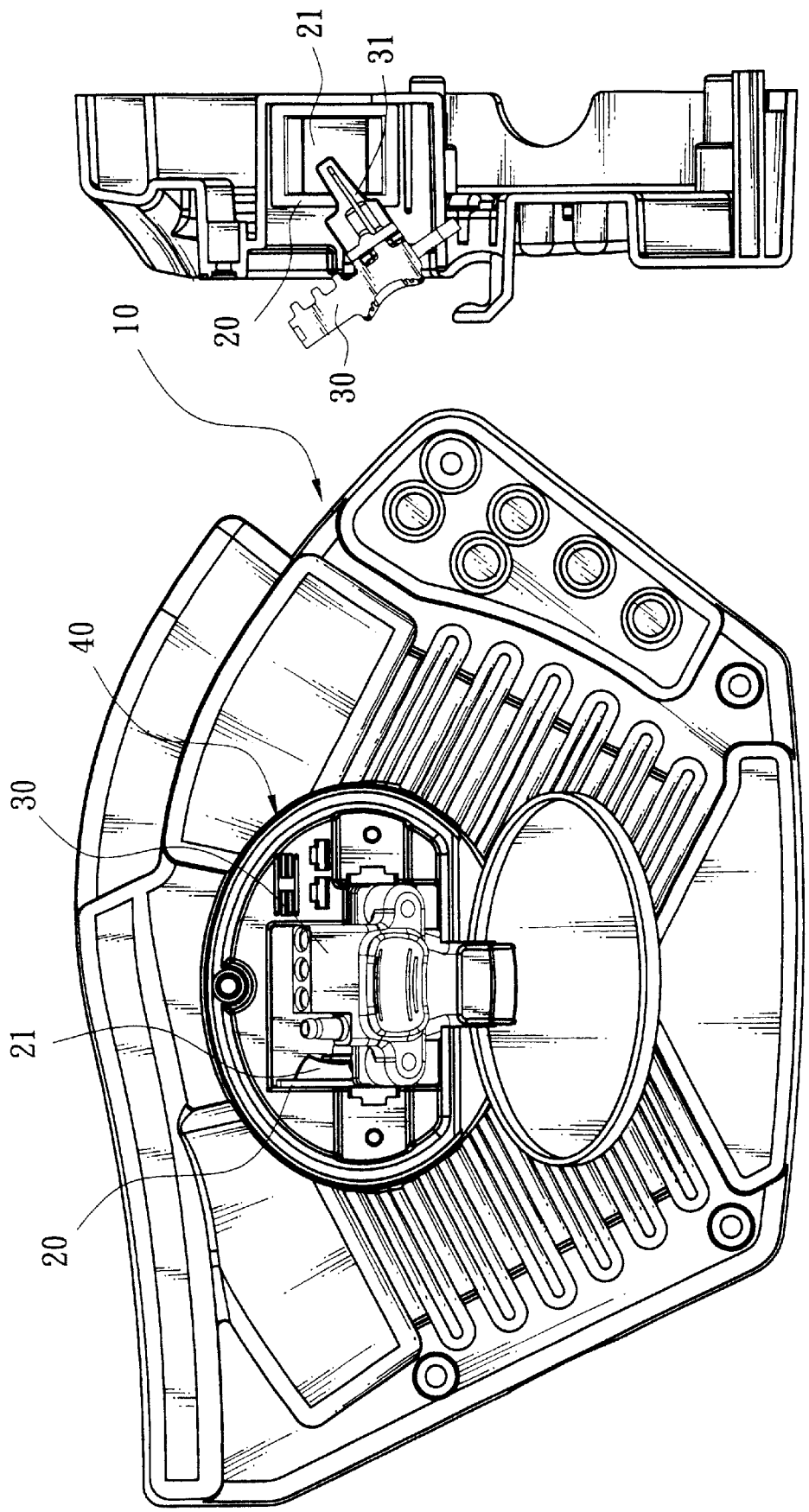
FIGS. 4A & 4B are diagrams of the motion of an embodiment of the invention when it is in use, showing the process of moving the charging terminal from position 1 to position 2.

To be safe, the aforesaid explanation indicates that, while the battery 11 is being charged, the switch 20 can be pushed so as to move its control button 21 to a position to interrupt electric supply, and stop the battery 11 from supplying power to the motor. To prevent accidents that arise when users forget to turn off the switch 20 before charging the battery 11, the charging terminal 30 and the switch 20 are linked. As shown in FIGS. 4A and 4B, whenever the battery 11 needs charging, the movable charging terminal 30 can be moved toward position 1 (as shown in FIGS. 5A and 5B) so that connection to the external source of electricity is allowed. When the charging terminal 30 is moved to position 1, it is connected to the external power supply. When charging is done, the charging terminal 30 is moved back to position 2 from position 1 (as shown in FIGS. 3A and 3B), so that users are not able to connect the charging terminal 30 to the external power supply.

Nevertheless, as shown in the drawings provided, a linkage rod 31 is installed on the charging terminal 30. The linkage rod 31 moves along with the charging terminal 30 in a synchronous manner. While the charging terminal 30 is moving toward position 1, the linkage rod 31 pushes the control button 21 so as to interrupt the electric supply (as shown in FIGS. 5A and 5B). As a result, the switch 20 interrupts the power supply for the motor from the battery 11, the motor cannot be started, and users' safety is ensured. When charging is done the charging terminal 31 is moved to position 2, the linkage rod 31 causes the control button 21 to be pulled and switched to a position for electric supply (as shown in FIGS. 3A and 3B), so that the battery 11 will supply power to the motor for generating motive force.

EFFECT OF THE INVENTION

The invention primarily allows a charging terminal 30 of an electric vehicle 10 to be moved to a position for being connected to an external power supply, whenever the electric vehicle 10 needs charging, so that it is impossible to start up the electric vehicle 10 while it is being charged. Therefore, accidents that arise when users touch a switch mistakenly in the course of charging the electric vehicles 10 can be prevented.

While the invention has been described by way of example and in terms of a preferred embodiment, it is to be understood that the creation is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connection device for charging an electric vehicle, the connection device being connectable to an external supply for charging a battery of the electric vehicle which is connected to a motor of the electric vehicle, the connection device comprising:
   a switch electrically connected to both the battery and the motor, the switch having a control button for controlling power supply from the battery to the motor;
   a charging terminal movably installed on a side of the switch and electrically connected to the battery, the charging terminal being movable between a first position and a second position, in the first position, the charging terminal being connectable to the external supply and in the second position, the charging terminal being prevented from being connected to the external supply;
   a linkage rod connected to the charging terminal, the linkage rod pulling the control button to a position to interrupt electric supply when the charging terminal is in the first position and moving the control button to a position to enable electric supply when the charging terminal is in the second position whereby the battery can operatively be disconnected from and connect to the motor of the electric vehicle; and
   a cover plate movable between a position to cover the switch and charging terminal and a position exposing the switch and charging terminal whereat the charging terminal can be moved to the first position so that the charging terminal can be connected to the external supply, the cover plate being readily visible to a user so that the position of the charging terminal can be readily determine whereby the charging terminal can be ensured to be in the second position when the vehicle is to be operated.

2. The connection device of claim 1, wherein electric vehicle has a seat and wherein the switch and the charging terminal are integral with the seat.

3. The connection device of claim 1, wherein the charging terminal is pivotally connected to the electric vehicle.

4. The connection device of claim 3, wherein the charging terminal is pivotable about a horizontal axis.

5. The connection device of claim 4, wherein the control button is pivotable about a horizontal axis which is non-coincident with the pivot axis of the charging terminal.

6. The connection device of claim 5, wherein the linkage rod is rigidly connected to the charging terminal and is pivotable therewith.

7. The connection device of claim 1, wherein the switch is a dual-positioned switch.

8. The connection device of claim 1, wherein the charging terminal and the control button are pivotable about non-coincident axes and wherein movement of the charging terminal from the first to the second position causes the linkage rod to engage and move the control button.

* * * * *